United States Patent [19]

Reynolds

[11] 4,300,724
[45] Nov. 17, 1981

[54] APPARATUS FOR INTRODUCING AN ADDITIVE INTO A DRILLING MUD SYSTEM

[75] Inventor: James W. Reynolds, Houston, Tex.

[73] Assignee: American International Tool Co., Inc., Houston, Tex.

[21] Appl. No.: 78,293

[22] Filed: Sep. 24, 1979

[51] Int. Cl.³ .............................................. A01C 3/06
[52] U.S. Cl. .................................... 239/654; 251/212
[58] Field of Search ............... 239/654, 655, 659, 102, 239/144, 325, 310, 345, 569; 251/212; 222/561

[56] References Cited

U.S. PATENT DOCUMENTS

| 1,755,329 | 4/1930 | McCormack | 239/654 |
|---|---|---|---|
| 2,785,840 | 3/1957 | Nave | 251/212 X |
| 3,105,620 | 10/1963 | Atkins et al. | 222/561 |
| 3,240,533 | 3/1966 | Mommsen | 239/325 X |

*Primary Examiner*—Bruce H. Stoner, Jr.
*Assistant Examiner*—Gene A. Church

[57] ABSTRACT

Apparatus for introducing an additive into a drilling mud system, which includes a hopper for containing the additive mounted substantially over a flow line for the flow of mud from the system therethrough. The hopper has a funnel-shaped lower portion terminating in a neck connected to the flow line. The neck of the funnel-shaped lower portion has a variable size orifice to control the rate of the flow of additive therethrough. A nozzle is provided in the flow line substantially below the neck for mixing the additive with the mud. A vibrator is provided for vibrating the lower portion of the hopper to encourage movement of the additive toward the neck. An air nozzle is provided for fluidizing the additive.

3 Claims, 2 Drawing Figures

APPARATUS FOR INTRODUCING AN ADDITIVE INTO A DRILLING MUD SYSTEM

BACKGROUND OF THE INVENTION

A. Field of the Invention

This invention relates to apparatus for mixing powdered or granulated material with a stream of liquid, and more particularly to an apparatus for introducing an additive into a drilling mud system.

B. Description of the Prior Art

During the drilling of oil and gas wells, it is often necessary to perform tour treatment of the mud system. The goal of tour treatment is to introduce relatively small quantities of additives uniformly throughout the mud system to change the chemical and physical properties of the mud. The additive should be introduced continuously and at a uniform rate into the mud system in order to provide the desired uniformity. In actual practice, however, tour treatment is performed by a rig crewman, who periodically deposits some quantity of additive into the suction pit where it is mixed to a limited extent with the mud and circulated into the bore hole. The present method of tour treatment fails to provide the desired uniformity.

SUMMARY OF THE INVENTION

It is therefore an object of the present invention to provide an apparatus that will introduce an additive into a drilling mud system at a controlled and uniform rate.

Briefly stated, the foregoing and other objects of the present invention are accomplished by providing a hopper for containing the additive and a flow line for the flow of mud from the mud system therethrough. The hopper is preferably mounted above the suction tank and includes a funnel-shaped lower portion terminating in a neck connected to the flow line. The neck has a variable size orifice to control the flow of additive therethrough. Means are provided for vibrating the lower portion of the hopper to encourage the movement of additive toward the neck. An air nozzle is provided adjacent to the neck for fluidizing the additive to facilitate the flow of the additive through the neck.

DESCRIPTION OF THE PREFERRED EMBODIMENT

Figure 1:
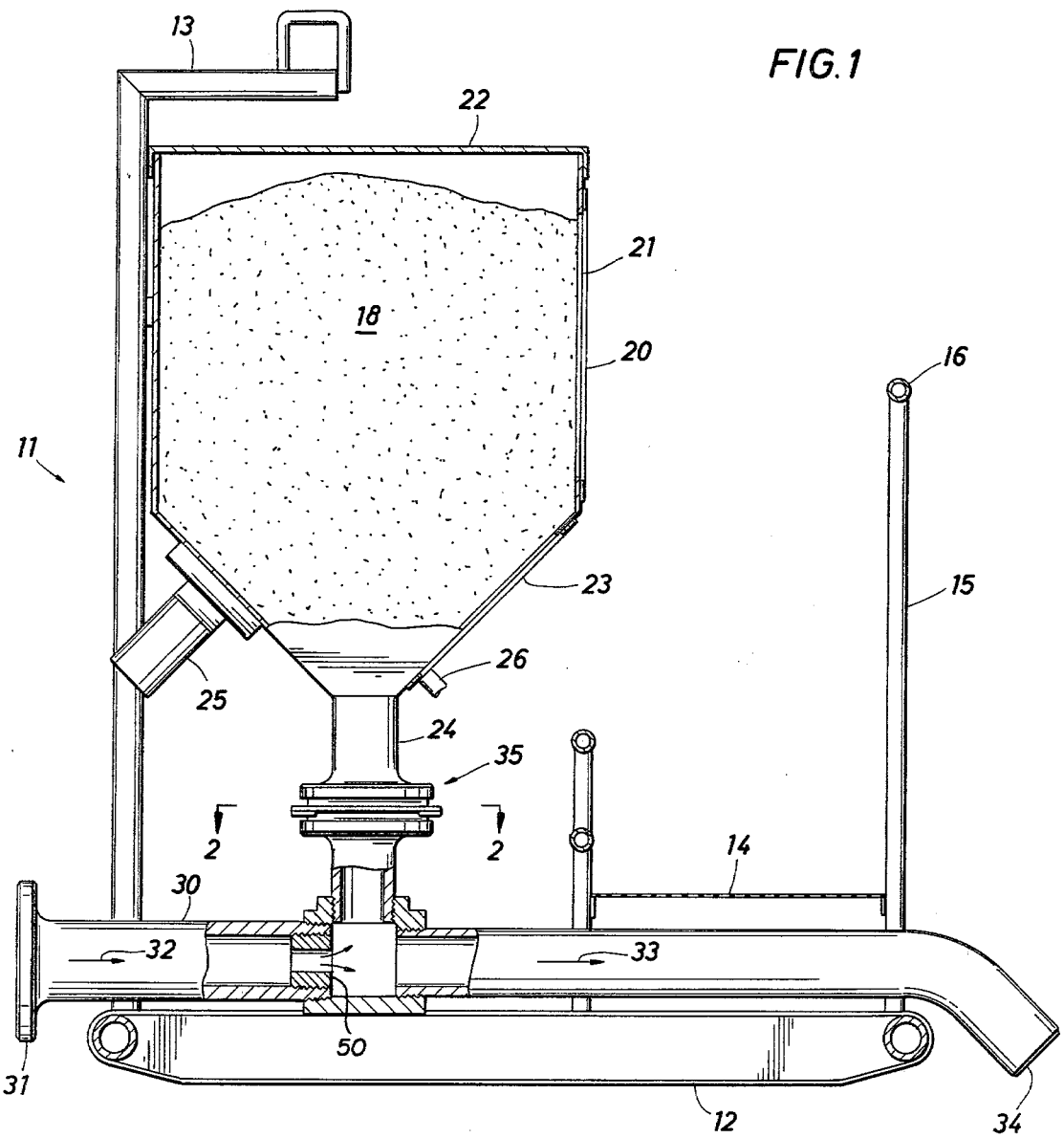
FIG. 1 is a side elevation view of the apparatus of the preferred embodiment.

Referring now to the drawings, the apparatus of the preferred embodiment of the invention is designated generally by the numeral 11 and is comprised generally of a hopper 20 mounted over a flow line 30. Apparatus 11 is of a unitary construction and is mounted on skids 12 for placement preferably over the suction pit (not shown). Apparatus 11 includes a lifting yoke 13 by which apparatus 11 may be lifted and placed upon the suction tank. Apparatus 11 also includes a catwalk 14 and associated safety equipment, as for example, stanchion 15 and rail 16.

Hopper 20 is adapted to contain the additive 18 and is preferably constructed of flat sheets of metal connected together by welding or the like. Hopper 20 includes a cubical upper portion 21 having an open top which is normally covered by a cover 22 to keep additive 18 dry. Hopper 20 also includes a tapered or funnel-shaped lower portion 23 which is joined to a tubular neck 24.

In order to encourage the movement of additive 18 toward neck 24, a vibrator 25 is attached to lower portion 23. Vibrator 25 is preferably of the pneumatic type and is operated to vibrate the walls of lower portion 23 thereby causing settlement of additive 18.

In order to facilitate the flow of additive 18 through neck 24, and air nozzle 26 is provided adjacent to neck 24. Air from nozzle 26 is directed upwardly into additive 18, which causes the fluidization of additive 18, thereby causing additive 18 to flow more easily through neck 24.

Figure 2:
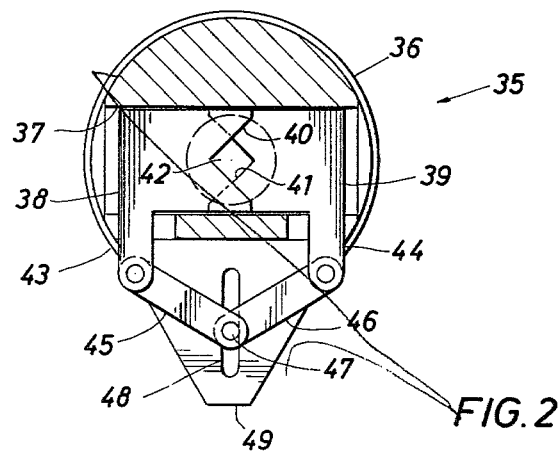
FIG. 2 is a sectional view taken along line 2—2 of FIG. 1 showing details of the variable size orifice of the present invention.

In order to control the rate of flow of additive 18 through neck 24 and into flow line 30, a variable sized orifice, designated generally by the numeral 35, is provided. Referring to FIG. 2, orifice 35 includes a housing 36 having a rectangular passageway 37 therethrough. Constrained for lateral movement within passageway 37 are a pair of orifice plates 38 and 39. In the example shown in the drawing, plate 38 is positioned above plate 39. Plate 38 has a notch 40 at one end thereof. Plate 39 has a similar notch 41. Plates 38 and 39 are configured such that notches 40 and 41 cooperate to form an aperature 42. As plates 38 and 39 are moved laterally with respect to one another, the size of aperature 42 is variable from 0, or completely closed, to the size of neck 24 (shown in phantom in FIG. 2), or fully open.

In order to control the size of aperature 42, operating means are provided. Plate 38 has joined substantially rigidly thereto an arm 43, which extends outwardly through housing 36. Plate 39 has a similar arm 44. Joined hingedly to arms 43 and 44 are a pair of linkage bars 45 and 46 respectively. Linkage bars 45 and 46 are joined pivotedly together by a pin 47. By movement of pin 47 in the direction toward aperature 42, linkage bars 45 and 46 cause arms 43 and 44 to spread apart, thereby opening aperature 42. By moving pin 47 in the direction away from aperature 42, linkage bars 45 and 46 cause arms 43 and 44 respectively to move together, thereby closing aperature 42. Pin 47 is constrained to move in a slot 48 in a plate 49 extending outwardly from housing 36. Slot 48 keeps pin 47 from moving sideways and thereby keeps aperature 42 centered within neck 24. Pin 47 may conveniently take the form of a bolt, which may be tightened to fix its position within slot 48 to thereby keep the size of aperture 42 from changing.

Beneath orifice 35, neck 24 is attached to flow line 30. Flow line 30 has a flange 31 at one end, which is adapted for attachment into the line from the mud-mixing equipment (not shown). Drilling mud flows through flow line 30 in the direction indicated by arrows 32 and 33 toward an open end 34 and into the suction pit (not shown). The inside diameter of flow line 31 is constricted by a nozzle 50 immediately prior to the point where neck 24 joins flow line 30. In the preferred embodiment, nozzle 50 comprises a section of reduced diameter pipe threadedly engaged with flow line 32. Nozzle 50 causes a spray of mud beneath neck 24 and enhances the mixing of additive 18 therewith.

In operation, apparatus 11 is placed on top of the suction pit and flow line 30 is connected to the mud line by means of flange 31. An appropriate additive 18 is deposited into hopper 20 and the size of aperture 42 is selected to produce the desired mixture. Vibrator 25 and air nozzle 26 may be used in order to facilitate the movement of additive through neck 24. After apparatus 11 has been put into operation, additive 18 is mixed automatically in the proper amounts in the mud. The mud mixture produced is more uniform than that produced by the prior art manual method. Additionally, the use of apparatus 11 frees one member of the rig crew to other things.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. Apparatus for introducing an additive into a drilling mud system, which comprises:
   a flow line for the flow of mud of said system therethrough;
   a hopper for containing said additive said hopper being mounted above said flow line, said hopper having a funnel-shaped lower portion terminating in a neck connected to said flow line;
   and a nozzle in said flow line substantially below said neck for mixing said additive with said mud;
   a housing disposed in said neck;
   a first orifice plate sliding mounted in said housing, said first orifice plate having a notch at one end thereof;
   a second orifice plate slidingly mounted in said housing, said second orifice plate having a notch at one end thereof, wherein said notches of said first and second orifice plates overly each other to form an aperture;
   a first arm substantially rigidly connected to said first orifice plate, said first arm extending outwardly through said housing;
   a second arm substantially rigidly connected to said second orifice plate, said second arm extending outwardly through said housing;
   a first operating linkage bar hingedly connected to said first arm; a plate mounted to said housing, said plate having a slot therein, said slot being radially aligned with the center of said aperature;
   and a pin inserted through said first and second operating linkage bars and said slot.

2. The apparatus as claimed in claim 1, including:
   means for vibrating said lower portion of said hopper to encourage the movement of said additive toward said neck.

3. The apparatus as claimed in claim 1, including:
   means adjacent to said neck for fluidizing said additive.

* * * * *